United States Patent
Arhab et al.

[11] Patent Number: 6,065,577
[45] Date of Patent: May 23, 2000

[54] LOCK-UP CLUTCH FOR A HYDRAULIC COUPING APPARATUS, ESPECIALLY FOR A MOTOR VEHICLE

[75] Inventors: Rabah Arhab, Saint-Brice; Pierre Bender, Cardonnette, both of France

[73] Assignee: Valeo, Paris, France

[21] Appl. No.: 09/166,781

[22] Filed: Oct. 6, 1998

[30] Foreign Application Priority Data

Sep. 23, 1997 [FR] France .................................. 97 11922

[51] Int. Cl.[7] ............................. F16D 13/58; F16H 45/02
[52] U.S. Cl. ..................................... 192/70.18; 192/3.29
[58] Field of Search ............................. 192/3.29, 70.18; 411/136, 155, 160, 161, 372

[56] References Cited

U.S. PATENT DOCUMENTS

| | | | |
|---|---|---|---|
| 2,072,176 | 3/1937 | Monroe | 411/155 |
| 3,171,518 | 3/1965 | Bergmann . | |
| 3,236,277 | 2/1966 | Jones | 411/155 |
| 4,353,444 | 10/1982 | Bionaz | 192/3.29 |
| 4,635,775 | 1/1987 | Kohler | 192/70.18 |
| 5,826,690 | 10/1998 | Maingaud et al. | 192/70.18 |

FOREIGN PATENT DOCUMENTS

| | | |
|---|---|---|
| 2726620 | 5/1996 | France . |
| WO 94/07058 | 3/1994 | WIPO . |

*Primary Examiner*—Rodney H. Bonck
*Attorney, Agent, or Firm*—Liniak, Berenato, Longacre & White

[57] ABSTRACT

A lock-up clutch for a fluid coupling has a rotating casing having a radial wall which is releasably coupled by the clutch to a piston. The wall is in a fixed axial position; the piston is arranged for relative axial displacement and is coupled to the wall by tongues. Fastening shanks extend through holes in the piston and holes through the ends of the tongues. A friction wedge is interposed between each tongue and the piston, thus preventing radial displacement of the tongue with respect to the piston after the piston has been secured on the fastening shanks (by means of fastening sleeves).

6 Claims, 6 Drawing Sheets

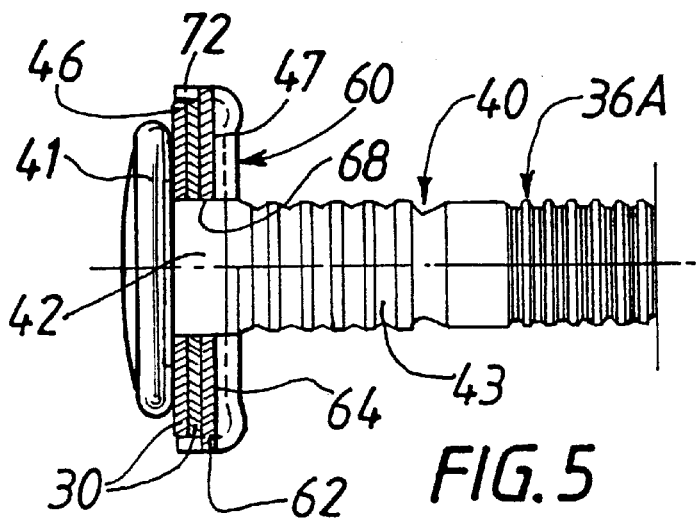
FIG. 5
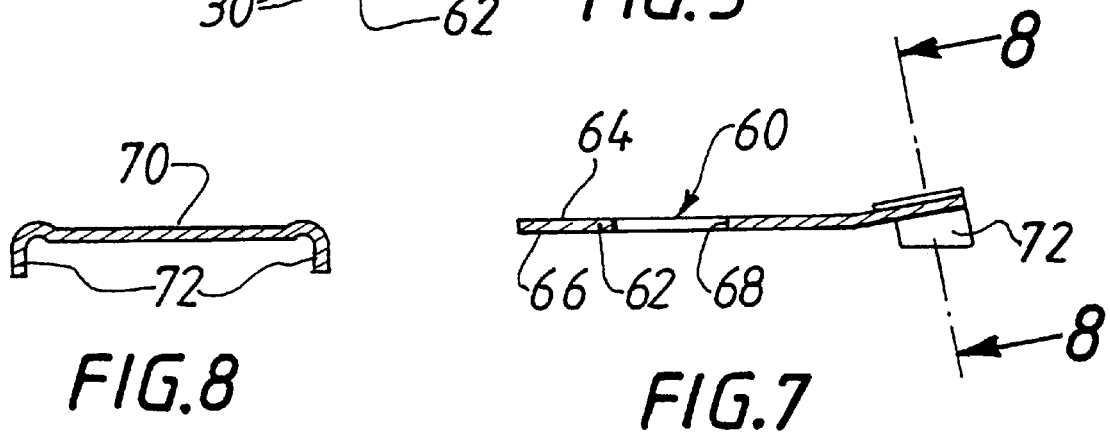
FIG. 8
FIG. 7
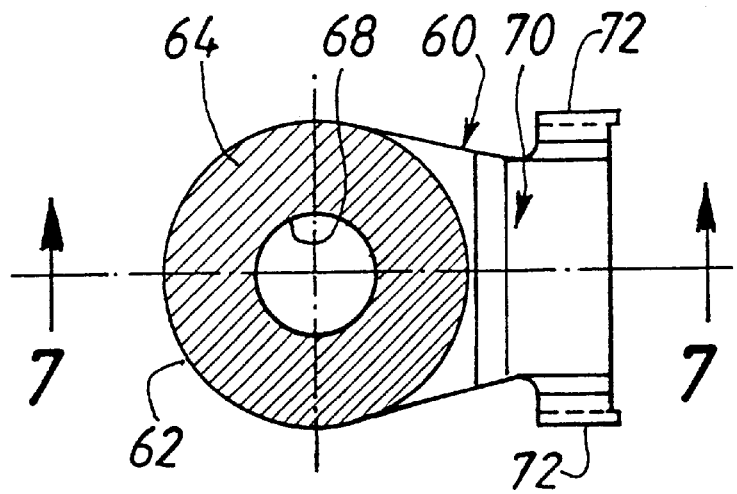
FIG. 6

LOCK-UP CLUTCH FOR A HYDRAULIC COUPING APPARATUS, ESPECIALLY FOR A MOTOR VEHICLE

FIELD OF THE INVENTION

The present invention relates to lock-up clutches for hydro kinetic coupling apparatus, also referred to herein as a fluid coupling, especially for motor vehicles.

More particularly, the invention relates to a lock-up clutch for a fluid coupling device, the clutch having at least one friction liner disposed axially between two elements comprising a transverse wall fixed against translational movement and a piston which is coupled in rotation to the wall and mounted for axial movement with respect to the latter.

BACKGROUND OF THE INVENTION

Such a lock-up clutch is known from French patent specification No. FR 2 726 620A, in which the said two elements are secured together in rotation through tongues, the lengthwise dimension of each tongue extending substantially along a chord of a circumference of the assembly, with first ends of the tongues being connected to a first one of the said two elements, through a driving or attachment ring common to all of the tongues, the attachment ring being attached to the said first element.

The tongues are mounted in the control chamber, and the second end of each tongue is attached to the second one of the said elements by a corresponding one of a plurality of fastening means, each fastening means comprising a first part applied to the second end of the corresponding tongue and comprising a head which is extended axially by a fastening shank that extends through a corresponding through hole in the second end of the tongue, so that the shank extends axially beyond a lateral face of the tongue (referred to as an internal face), which is gripped axially against a lateral engagement face (referred to as an external lateral engagement face) which is formed in facing relationship on the said second element.

The fastening means proposed in the above mentioned French patent specification include, on the other side of the second element, a second part which engages with the first part. These fastening means which are employed for attaching the tongues to the piston, which in that French patent constitutes the second element, enable assembly to be carried out blind, and with a reduced number of components, by a simple process of stacking the components in a common axial direction. First of all the piston is engaged on the first parts of the fastening means carried by the second ends of the tongues, and subsequently the second parts of the fastening means are very simply put in place. In order to engage the second parts with the associated first parts of the fastening means, it is only necessary to work on one side of the piston.

In order to permit these assembly and fastening operations, it is however necessary to provide a radial clearance between the body of each shank of a first part of the fastening means and the axially oriented hole of the piston through which it extends. The simple effect of axial seaming or gripping that results from the engagement of the second parts on the first parts does not allow for any fortuitous subsequent displacements of the piston that may occur with respect to the shanks in a radial plane, which can be detrimental.

In general terms, each fastening means include at least one first part having a head which is extended axially by a fastening shank applied to the second end of the corresponding tongue, with the fastening shank passing with a radial clearance through the said second element of the clutch, so as to facilitate fitting of the second element on the shanks or fitting of the shanks on the second element.

It is therefore important to avoid any possible displacement of the second element with respect to the shanks, and to do this in a simple and inexpensive way.

DISCUSSION OF THE INVENTION

According to the invention, a lock-up clutch for a fluid coupling device, having at least one friction liner disposed axially between two elements comprising a transverse wall fixed against translational movement and a piston which Is coupled in rotation to the wall and mounted for axial movement with respect to the latter, in which the said two elements are secured together in rotation through tongues, the lengthwise dimension of each tongue extending substantially along a chord of a circumference of the assembly, with first ends of the tongues being connected to a first one of the said two elements, for example through a driving or attachment ring common to all of the tongues, the attachment ring being attached to the said first element, and in which the second end of each tongue is attached to the second one of the said elements by a corresponding one of a plurality of fastening means, each fastening means comprising a first part applied to the second end of the corresponding tongue and comprising a head which is extended axially by a fastening shank that extends through a corresponding through hole in the second end of the tongue, so that the shank extends axially beyond a lateral face of the tongue (referred to as an internal face), which is gripped axially against a lateral engagement face (referred to as an external lateral engagement face) which is formed in facing relationship on the said second element, is characterised in that a friction wedge, through which the shank of the first part of the corresponding fastening means passes, is interposed axially between the internal lateral face of each tongue and the external lateral engagement face of the second element, and in that the portion of the side face of each friction wedge (referred to as an inner side face) which is clamped axially against the second element, is a rough surface portion.

The friction wedge prevents any displacement of the second element with respect to the shanks, while it is easy to fit the second element on the shanks or the shanks on the second element.

The friction wedge is a simple component, so that the arrangement in accordance with the invention is both simple and inexpensive. In addition, the friction wedge has a small axial dimension and is not detrimental in any way. Thus, in the case where the tongues are fixed on a common drive ring, also referred to as an attachment ring, the presence of the friction wedges does not make it necessary to modify the attachment ring, which can thus be a component of standard design.

The friction wedges are light in weight, so that in the case where the second element is the piston, axial movement of the piston is not adversely affected by the presence of the friction wedges.

Each fastening means can be made in two parts, as described in French patent specification No. FR 2 726 620A. However, in another embodiment, each fastening means may be in one part only, and consist for example of rivets which are lighter and cheaper than for the case where the fastening means are in two parts. For this purpose, it is necessary to provide through holes in the first element in the manner described in the specification of international patent application No. PCT/FR98/01393, so that it is possible to work from both sides of the second element using a tool and an anvil or counter-tool in order to perform the riveting operation. In this connection, the counter-tool is passed through the through hole concerned, so as to make contact with the head of the rivet, which has been fitted in advance on the tongue together with the friction wedge. The tool upsets (crushes) the free end of the shank of the rivet in contact either with the piston (which has easily been fitted over the shanks), or with the transverse wall, or with a component which is fixed to the latter after the shanks have, easily, been passed through.

The holes are finally closed by means of suitable obturating and sealing elements such as plugs, plates, capsules, or other suitable closures.

Due to the fact that it is possible to work from both sides of the second element because of the through holes, the fastening means may of course comprise bolts. The shanks may accordingly be partly threaded. Before the final riveting operation, the friction disc of the clutch, the friction liner (or each friction liner) of which is arranged to be gripped between the piston and the transverse fixed wall, is of course fitted in place.

Thus, in one embodiment of the invention, the transverse fixed wall has a through hole in axial coincidence with rivets which fasten the second ends of the tongues to the piston. The friction wedges being lighter than the second part of the second fastening means of the prior art, the invention therefore gives easier axial displacement of the piston.

In another embodiment of the invention, through holes are formed in the piston in axial coincidence with the means whereby the common attachment ring for the tongues is fastened to the transverse fixed wall. These holes are finally closed with sealing obturating elements such as plugs.

With these arrangements, the first ends of the tongues are first fitted to the common attachment ring, and the piston is then attached on the second ends of the tongues equipped with the friction wedges and shanks, by working from both sides of the piston. Subsequently, after the friction disc has been fitted using the through holes, the common attachment ring is fixed to the transverse fixed wall, after which the through holes are finally closed by suitable obturating elements such as plugs or other means, as described in the above mentioned international patent specification, to which reference should be made for more detail.

The through holes enable the attachment ring to be fitted finally to the transverse fixed wall (which is typically of metal) by adhesive bonding or welding. In another version, the attachment ring is secured by riveting to the transverse fixed wall by virtue of through holes which enable one or more tools to pass through them, to make contact in a manner known per se with rivets during the riveting operation. For example, the rivets may be integral with the transverse wall, being formed by extrusion. In that case the rivets may be equipped with friction wedges in contact with the heads of the rivets defined by the transverse wall. The rough surface portion of each friction wedge is accordingly adapted to make contact with the attachment ring.

Fastening of the tongues and attachment ring may therefore be achieved by riveting, with the shanks of the fastening means extending with a radial clearance through the second element mentioned above. More precisely, in this embodiment, the rivets associated with the first ends of the tongues extend through the attachment ring with a radial clearance which is smaller than that which exists between the shanks of the rivets associated with the second ends of the tongues and the associated through holes, for example perforations, in the piston.

The tongues may of course be secured directly on axially projecting bosses, which are either, for example, attached by welding on the transverse wall or formed as pressed-out portions of the transverse wall in the manner described in French patent specification No. FR 2 726 620A. In that case, the second element is the transverse wall, the first element being the piston.

Thus, the first ends of the tongues are first fixed to the piston, using for example a set of first rivets, the shanks of which pass through the perforations of the piston. Then, after the friction disc has been fitted, the second ends of the tongues, equipped with the friction wedges and rivets, are fixed on the bosses using a set of second rivets, having shanks which extend with a radial clearance through holes formed in the bosses. For this purpose the piston has through holes in axial coincidence with the bosses, so that one or more counter-tools or anvils for riveting purposes can be passed through them to bear on the heads of the rivets. The friction wedges are interposed axially between the bosses and the second ends of the tongues. The shanks of the second rivets are upset using one or more tools working on the side of the transverse wall that faces towards the outside away from the piston.

After this riveting operation, the through holes are closed and sealed using obturating elements which are fitted for example by force-fitting, snap-fitting, or adhesive bonding in the through holes.

The shanks of the second fastening rivets extend through the holes in the bosses with a radial clearance which is greater than that which exists between the shanks of the first fastening rivets and the associated holes in the piston. Therefore, no displacement occurs between the tongues and the piston due to the expansion of the first fastening rivets. The friction wedges prevent any axial movement occurring between the tongues and the transverse wall.

In this specification, the tongues have their first ends anchored by first fastening means (such as the first rivets just described), their second ends being secured, to the second element of the clutch, by second fastening means that constitute the plurality of fastening means which include the friction wedges according to the invention.

The second fastening means may of course comprise bolts instead of rivets, and in that case it is necessary to provide sealing washers.

In a modified version, the bosses may be replaced by the common attachment ring. In this version, the attachment ring is secured on the transverse wall, for example by riveting, and the first ends of the tongues are secured on the piston. The second ends of the tongues, equipped with the friction wedges, are then secured by riveting on the lugs which are formed for this purpose in axial projection on the attachment ring. To this end, the piston and the transverse wall have, in axial coincidence with the lugs of the attachment ring, through holes for passage through them of the riveting tool or tools and of the riveting anvils or counter-tools, respectively.

Once the riveting operation is completed, the through holes are closed using suitable obturating elements.

The friction wedges are interposed axially between the lugs and the second ends of the tongues, with the shanks of the second fastening rivets extending with a radial clearance through holes formed in the lugs of the attachment ring in axial coincidence with the through holes in the piston and those in the transverse wall. Here, the transverse wall, via the attachment ring, constitutes the above mentioned second element.

In a further embodiment, a friction wedge is associated with each of the ends of the tongues, i.e. both the first and second fastening means incorporate these wedges. All combinations are possible because of the presence of the through holes.

According to a preferred feature of the invention, the rough surface portion of each wedge is a surface portion which may for example be annular, and which surrounds a hole of the wedge through which the fastening shank passes.

According to another preferred feature of the invention, each friction wedge is applied to the second end of the corresponding tongue.

According to a further preferred feature of the invention, the said first part of each said second fastening means is applied to the associated friction wedge by force-fitting the fastening shank in the hole of the friction wedge. This arrangement is both simple and inexpensive.

Preferably, the second end of each tongue is applied to the first part of the associated fastening means by force-fitting the fastening shank of the latter in the corresponding through hole of the second end of the tongue.

In some embodiments, each friction wedge is fixed to the second end of the associated tongue by bonding of a portion of its outer side face to the inner side face of the second end of the tongue, for example by adhesive bonding or welding.

In some embodiments, each friction wedge comprises a washer portion having the said rough surface portion, the washer portion being extended radially by an indexing arm, projecting from the washer portion in substantially the same plane, the indexing arm being adjacent to the inner side face of the associated tongue and including, in the vicinity of its free end, two opposed indexing lugs, each of which is engaged axially along one of the two longitudinal opposed edges of the tongue.

Preferably, the indexing arm of each friction wedge makes an acute angle with respect to the plane of the inner side face of the associated tongue.

Preferably the said first element is the transverse wall of a casing element of the clutch, and the said second element is the piston.

The second part of the fastening means may be a sleeve which is swaged radially on a ridged portion of the fastening shank.

Further features and advantages of the invention will appear more clearly on a reading of the following detailed description of some preferred embodiments of the invention, which is given by way of non-limiting example only and with reference to the accompanying drawings.

BRIEF DESCRIPTION OF THE DRAWINGS

FIG. 5 is a detail view on an even larger scale, in cross section taken on the line 5—5 in FIG. 3.

FIG. 6 is a large scale front view of one of the friction wedges shown in FIGS. 3 to 5.

FIG. 7 is a view in cross section taken on the line 7—7 in FIG. 6.

FIG. 8 is a view in cross section taken on the line 8—8 in FIG. 7.

FIG. 11 shows this same second embodiment in a cross section similar to the cross section on which FIG. 4 is taken.

DESCRIPTION OF PREFERRED
EMBODIMENTS OF THE INVENTION

Figure 1:
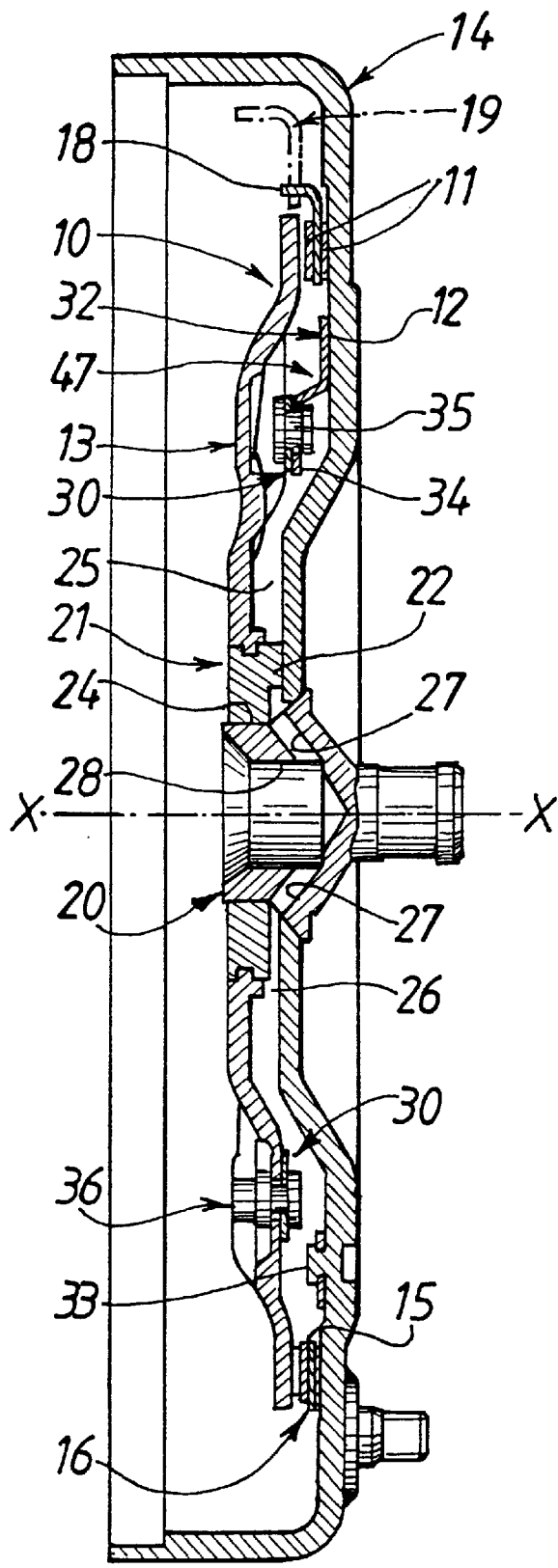
FIG. 1 is a view in axial cross section of a lock-up clutch in the state of the art.
Figure 2:
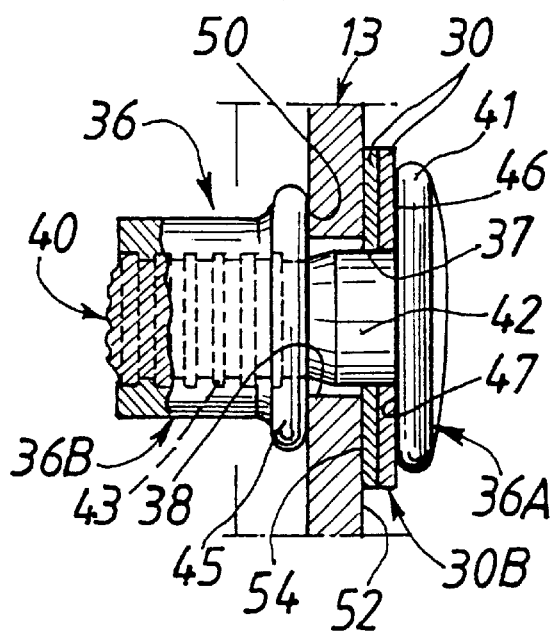
FIG. 2 is a scrap view reproducing a portion of FIG. 1 on a larger scale, which shows in detail the design of the means for fastening the second ends of the tongues, again in accordance with the state of the art.

Reference is first made to FIGS. 1 and 2 showing a lock-up clutch 10 of the prior art. This clutch 10 is intended for incorporation in a hydro-kinetic or fluid coupling apparatus (not shown as such in the drawings) having an axial axis of symmetry X—X to enable a turbine wheel of the fluid coupling to be coupled to its impulse wheel mechanically for rotation, directly or indirectly, given that the turbine wheel is arranged to be mounted in rotation via a hub on a driven shaft which has a fluid flow channel, while the impulse wheel is arranged to be mounted on a driving shaft for rotation with the latter.

The lock-up clutch 10 includes at least one friction liner 11 which is arranged axially between a wall 12, located in a position fixed axially along the axis X—X (and referred to for convenience as the fixed wall 12) and a piston 13, which is mounted for axial movement with respect to the fixed wall 12 while being coupled to the latter for rotation with it. While the expression "fixed wall" is to be understood to mean here simply that the wall 12 is in a fixed axial position, it goes without saying that the wall 12 is driven in rotation about the axis X—X of the assembly. The wall 12 is arranged to be coupled in rotation to a driving shaft.

The lower part of FIG. 1 shows one of the projecting elements (not denoted by a reference numeral) by which the fixed wall 12 is coupled in rotation to the driving shaft, in a manner known per se, with the aid of a radial plate member 21. In the example shown in FIG. 1, the fixed wall 12 is part of a casing of the clutch. More precisely, the wall 12 is part of the base wall of a casing shell 14, the general form of which is that of a cloche or pot. The impulse wheel of the fluid coupling is fixed to the casing shell 14 for rotation with it. The friction liner or liners 11 and the piston 13 are arranged within the shell 14.

In the example shown in FIG. 1, there are two friction liners 11 which are arranged on either side of an annular linear support plate 1 5 which is generally flat. The liners are attached on the support plate 15 by adhesive bonding for example, so as to constitute with the support plate 15 an annular friction disc 16. In another version, the support plate 15 is encapsulated within one friction liner. In a further version, one of the friction liners is fixed on the piston 30 and the other on the fixed wall 12.

The support plate 1 5 includes, from place to place on its radially outer periphery, lugs 18 which project axially and lie radially beyond the outer periphery of the piston 13. As indicated in phantom lines in FIG. 1, these lugs 18 are arranged to couple the friction disc 16, in rotation by meshing engagement, with one of the elements of a torsion damping device 19, the other element of which is itself fixed to the turbine wheel of the fluid coupling device for rotation with it.

The fixed wall 12 carries a centring nose 20 which projects axially from the central zone of the wall 12. The centring nose 20 itself carries a radial support ring or sleeve 21, which is mounted on the centring nose 20 and carries the piston 13. The piston 13 is mounted for sealed axial sliding movement on the centring nose 20 through the radially inner periphery of the sleeve 21.

The sleeve 21, which is a separate component from the centring nose 20, is in direct abutment against the fixed wall 12, and for this purpose it is formed with axial abutment bosses 22 projecting from place to place on the appropriate radial surface of the sleeve. The sleeve 21 is carried on a surface 24 of the centring nose 20. It will be noted that the abutment bosses 22 enable fluid, in this case oil, to flow between them.

The sleeve 21 is located axially on the centring nose 20 on the opposite side of the latter from the fixed wall 12 (for example). As shown in FIG. 1, the material of the end of the centring nose 20 remote from the fixed wall 12 and beyond the sleeve 21 is upset so as to produce reflowed material which provides further location of the sleeve 21 axially on the centring nose 20.

The fixed wall 12 and the piston 13, together with the sleeve 21, define a hydraulic control chamber 25. The friction liners 11 are at the outer periphery of this control chamber 25. Radial passages 22 are defined between the abutment bosses 22, and the centring nose 20 is formed with through holes 27 extending outwards from its bore 28. The hydraulic control chamber 25 is able to be put into communication with a source of pressurised fluid (not shown) through the radial passages 26, the through holes 27 and the bore 28 of the centring nose. More precisely, the fluid duct in the driven shaft is in communication with the axial bore 28 of the centring nose.

For further details of the above arrangement, reference may be made for example to international patent specification No. WO94/07058 and the corresponding U.S. Pat. No. 5,590,750, the contents of which are to be considered as being annexed to the present specification. The turbine and impulse wheels of the fluid coupling are also disclosed in those documents, given that the turbine wheel includes a hub which is arranged to be mounted on the driven shaft for rotation of the latter with the hub.

In a manner known per se, the piston 13, which is of metal in this case, is fixed to the fixed wall 12 (again of metal in this case) for rotation with the latter, through a set of tongues 30.

Figure 3:
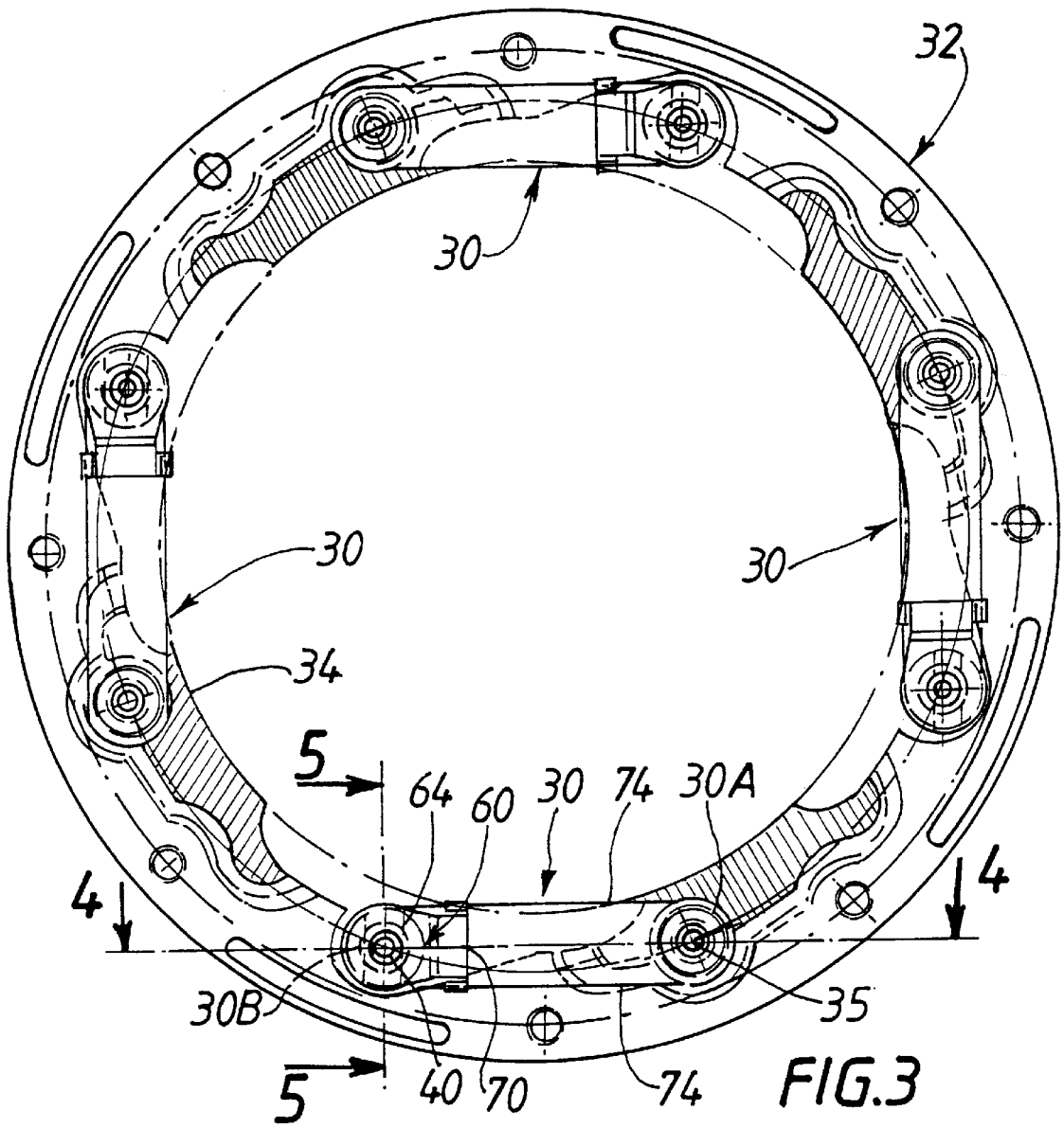
FIG. 3 is a view showing an attachment ring carrying the tongues, the latter being equipped with the means for fastening their second ends, illustrating one embodiment of the present invention.

In this connection reference is now also made to FIG. 3. As can be seen in particular in FIG. 3, the lengthwise dimension of each tongue 30 extends substantially on a chord of the circumference of the assembly (i.e. tangentially to a common pitch circle). The tongues 30 are deformable elastically in the axial direction so as to give the piston 13 all of the axial mobility which is necessary with respect to the fixed wall 12. In this example, the tongues 30 are of metal, and in particular of treated steel.

In the interests of simplicity, the word "tongues" will be used in this description to mean either tongues which act in isolation or tongues each of which consists of a stack of elementary tongues, for example a pair of elementary tongues laid together and of identical design, in the manner which is in fact shown in all of the Figures of the accompanying drawings.

In this case the tongues 30 are arranged within the hydraulic control chamber 25, being disposed in the space that extends radially between the friction liners 11 and the axis X—X of the assembly. They are attached either directly or indirectly to the fixed wall 12 through a first one 30A of their ends. A second end 30B of each tongue 30 is attached to the piston 13.

In the various clutches shown in the drawings, the tongues 30 are attached to the fixed wall 12 by means of an intermediate member 32 which is fixed to the wall 12. In practice, this intermediate member 32 is an attachment ring which is common to all of the tongues 30, and which is secured to the fixed metallic wall 12 by means of rivets 33, the bodies or shanks of which are formed integrally with the fixed wall 12, for example by extrusion. The attachment ring 32 is therefore also a driving or actuating ring common to all of the tongues 30, and has at its radially inner periphery from place to place, offset axially towards the metallic piston 13 with respect to its central main portion, lugs 34 which project axially. The first ends 30A of the tongues 30 are secured to these lugs 34 by means of rivets 35, constituting first fastening means as discussed earlier herein.

In the state of the art as illustrated in FIGS. 1 and 2, for attachment of the second ends 30B of the tongues 30 to the piston 13, a plurality of second fastening means 36 are used. These fastening means are shown in more detail in FIG. 2, and are in two parts, while being adapted to extend generally (in a manner known per se) through the tongues 30, via a hole 37 in each tongue through the piston 13 via holes 38 in the latter. Thus, each fastening means 36 which secures the second end 30B of a tongue 30 to the piston 13 comprises a first part 36A and a second part 36B. The first part 36A is applied to the tongue 30 in advance and in a manner which will be described in greater detail later herein. To be fitted on the first part 36A, the second part 36B only needs to be offered up on the accessible side of the piston 13, that is to say on the left hand side with reference to FIGS. 1 and 2.

In the drawings the fastening means 36 associated with a tongue 30 consist of a fastening of the type consisting of an upset bolt shank in the manner described in French patent specification No. FR 2 726 620A.

Each first part 36A consists of a special bolt having a shank 40 and a head 41. The shank 40 passes with a radial clearance, as can be seen in greater detail in FIG. 2, through an axially oriented through hole such as a hole 38 formed in the piston 13. Extending from the head 41, the shank 40 comprises, in axial succession from right to left in FIGS. 1 and 2, a smooth portion 42 and a first ribbed portion 43. At its junction with the shank 40, the head 41 defines a generally radially oriented abutment surface 47, which is a flat surface through which it is able to be applied axially against an outer side face or external lateral engagement surface 46 formed in facing relationship with it on the double tongue 30. The surface 46 extends around the corresponding through hole 37 in the tongue.

The bolt 36A of the fastening means 36, constructed in this way, is for example applied to the associated tongue 30 by forcibly engaging the smooth portion 42 of the shank 40 in the through hole 37 of the tongue 30. The bolt 36A is thereby secured against loss. In order to facilitate this force-fitting, the free end of the smooth portion 42 of the shank 40 is for example slightly frusto-conical. In another version (not shown), or in combination, the smooth portion 40 may be knurled.

In another modified version, the first part 36A of the fastening means 36 may also be applied to the tongue 30 by adhesion of the engagement surface 47 of its head 41 to the surface 46 of the tongue 30, for example by welding or adhesive bonding.

The second part 36B of the fastening means 36 consists of a simple sleeve which is arranged to be swaged on the first ribbed portion 43 of the shank 40 of the bolt 36A. In this example the sleeve 36B includes a base or collar portion 45 on the same side as the piston 13. This collar portion 45 is of enlarged diameter to prevent it from undergoing plastic flow into the through hole 38 of the piston 13.

Figure 4:
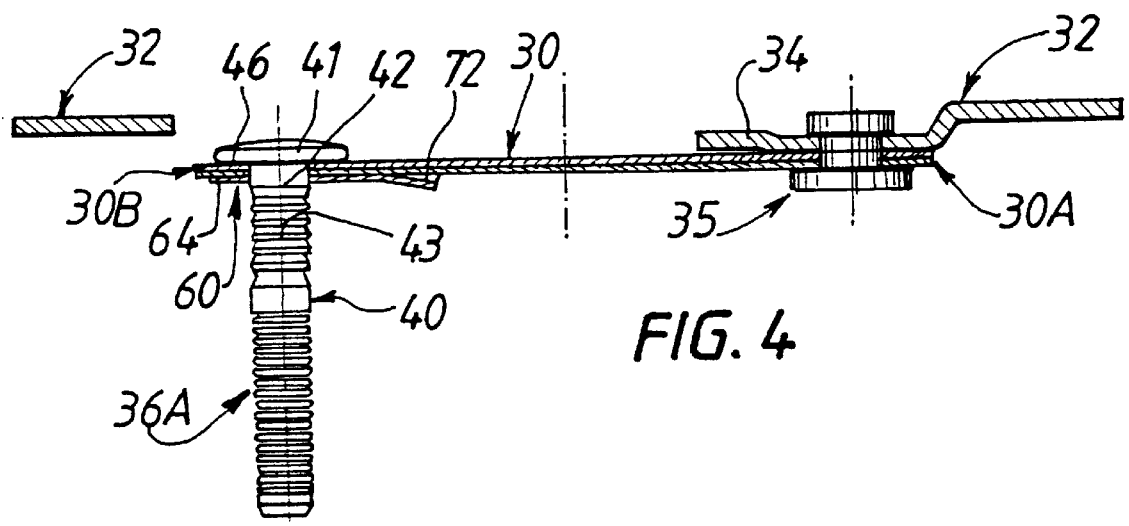
FIG. 4 is a detail view on an enlarged scale as seen in cross section taken on the line 4—4 in FIG. 3.

The assembly operation using the fastening means 36 is carried out as follows. The tongues 30 are first attached to the fixed wall 12 by means of their first ends 30A. For this purpose a sub-assembly 48 which is shown in FIG. 4 is first constructed. This sub-assembly 48 comprises the intermediate ring 32, the tongues 30 attached by means of the rivets 35 on the lugs 34 of the ring 32, and, carried by the tongues 30, the bolts 36A of the fastening means 36.

This sub-assembly 48 is then attached on the fixed wall 12 by means of the rivets 33, and for this purpose the lugs 34 have holes through which the shanks of the rivets 33 pass. This arrangement ensures axial engagement of the piston 13, through its holes 38, on the bolts 36A of the fastening means 36 carried by the second ends 30B of the tongues 30. This fitting operation is easy to carry out because of the radial clearance between the through holes 38 and the shanks 40.

It is preferred that the engagement of the piston 13 on the bolts 36A of the fastening means 36 is carried out with simultaneous centring of the piston 13 with respect to the fixed wall 12. To this end, in this example advantage is taken of the centring nose 20, by using a centring tool not shown in the drawings, which bears internally on the centring nose 20 and externally on the intermediate ring 32. As a result of the centring obtained in this way, the piston 13, which is able to find its position due to the presence of the radial clearance existing between its through holes 38 and the shanks 40 of the bolts 36A of the fastening means 36, has the advantage that it does not interfere with the sleeve 21. On the contrary, it engages correctly by sliding movement on the latter.

Finally, it is then sufficient to fit the second part 36B of the fastening means 36 in position, by engaging the sleeves 36B constituting the second parts on the shanks 40 of the bolts 36A until they come into axial abutment on the piston 13.

For this purpose, the external radial faces 50 of the collar portions 45 come into axial engagement against the internal lateral face of the piston 13, while the outer side face 52 of the piston, which is oriented generally radially, is in axial engagement against the inner side faces 54 (in facing relationship) of the second ends 30B of the tongues 30. The face 52 is therefore an engagement face, also referred to as the external lateral engagement face, which is formed by a local stamping or press forming operation in the piston 13. In order to achieve this axial clamping engagement, a tractive force is exerted, using a specialised tool, on the shanks 40 of the bolts 36A of the fastening means 36, after which radial pressure is exerted on the sleeves 36B against the ribbed portions 43 of the shanks 40, thereby securing the two components together by swaging.

In modified versions which are not shown in the drawings, and in accordance with the disclosures of French patent specification No. FR 2 726 620B, the tongues 30 may also be made integral, through their first ends 30A, with the intermediate ring 32 by which they are attached to the fixed wall 12.

As has been already mentioned herein, and as can be seen in FIG. 2, due to the design of the fastening means 36 and because of the way assembly is carried out in the state of the art, there exists a radial clearance between the through holes 38 and the shanks 40. This clearance facilitates fitting of the piston 13 over the shanks 40, and is larger than that which exists between the shanks of the rivets 35 and the holes in the lugs 34 through which the rivets 35 pass.

In order to overcome the drawbacks which result from this radial clearance, and with reference here to FIGS. 3 to 8, the invention provides a friction wedge 60 interposed axially between the second ends 30B of the tongues 30 and (in the present case) the piston 13, with the shank 40 of the first part 36A of each fastening means 36 extending through the corresponding friction wedge 60.

The construction of the friction wedges 60 will now be described in detail with particular reference to FIGS. 3 to 8. As can be seen in FIG. 3, the second end 30B of each of the double tongues 30 is equipped with one friction wedge 60 in accordance with the invention. In this example the friction wedge 60 is of metal and is light in weight because it is thin.

Each friction wedge 60 consists essentially of a main portion 62 which has the general form of a circular ring or washer, and which is bounded axially by an annular inner side face 64 which is in contact with the external engagement face 52 of the piston 13 (see FIG. 2); and by an annular outer side face 66 which is in contact with the second end 30B of the associated tongue 30.

In accordance with the provisions of this invention, the annular inner side face 64 includes or consists of a surface portion which is rough, as is indicated diagrammatically in FIG. 6.

The main or washer portion 62 of the friction wedge 60 has a central through hole 68 which is arranged for the cylindrical smooth portion 42, with a frusto-conical end, of a shank 40 of a bolt 36A of the associated fastening means 36 to pass through it. This is for example achieved by force-fitting so as to attach the portion 62, and therefore the friction wedge 60 itself, to the shank 40 and to the second end 30B of the corresponding double tongue 30. The friction wedge 60 cannot therefore be lost before the piston is fastened on the tongues.

After the clutch mechanism has been assembled, each of the rough inner annular surfaces 64 will be in contact with a facing portion of the external lateral engagement face 52 of the piston 13, and the frictional cooperation which is thereby obtained between the wedges 60 and the piston 13 prevents any displacement of the shanks 40 in the radial direction with respect to the piston 13 after the bolt or sleeve of the fastening means 36 have been fastened axially together.

In another embodiment which is not shown in the drawings, the friction wedge 60 may be attached to the second end 30B of the corresponding tongue by adhesion of an external lateral surface portion 62 to the inner side face 54 of the second end 30B of the tongue 30, for example by adhesive bonding or welding.

In accordance with another feature of the invention, each main portion 62, in the form of an annular washer portion of the friction wedge 60, is extended radially by an indexing arm 70 that projects from the washer portion in substantially the same plane as, and adjacent to, the inner side face 64 of the tongue 30. The indexing arm includes, in the vicinity of its free end, two opposed indexing lugs 72. Each of these indexing lugs 72 lies along one of the two longitudinal opposed edges 74 of the associated tongue 30.

In the particular version which is shown in particular in detail in FIGS. 6 to 8, the indexing arm 70 makes an acute angle with the plane of the inner side face 64 of the associated tongue 30, that is to say it makes an acute angle with respect to the plane of the main portion 62, or rough washer portion, of the friction wedge 60. In this way the friction wedge is prevented from rotating with respect to the associated tongues 30. It is also indexed in the circumferential sense.

The lugs 18 of the liner support plate 15 (FIG. 1) may of course be coupled in rotation, for example by means of a coupling of the tenon and mortice type, to a member which is fixed to the turbine wheel of the fluid coupling.

In the present case the ends 30A and 30B of the tongues 30 are of rounded form and have a semi-circular contour. The second ends 30B are overlaid by the friction wedges 60, and more precisely by the annular ring portion 62 of the latter.

In general terms, the wedges 60 preferably overlie the second ends 30B of the tongues 30, and therefore have a form which is complementary to the latter. The second ends 30B of the tongues 30 may, in a modified version, be of rectangular form. In that case the washer portion 62 is replaced by a rectangular plate element with a rough surface. The wedges 60 mask the second ends of the tongues 30 and protect the latter.

The rough surface portion of a friction wedge surrounds the hole 68 of the wedge through which the fastening shank passes. In another version, the second ends 30B of the tongues 30 may extend beyond the wedges 60. This arrangement is of less advantage, because it leads to a reduction in the area of the rough surface of the friction wedges.

In all cases, the attachment ring or intermediate ring 32 is unchanged. In this connection, the ring 32 is formed with cut-outs, visible in FIG. 3 in the region of the second ends 30B of the tongues 30, so as to allow passage of the shanks 40 and to permit axial movement of the tongue 30. The presence of the friction wedges 60 does not require the form of these cut-outs to be modified. In another version, the friction wedges 60 may extend beyond the second ends 30B of the tongues 30.

Figure 9:
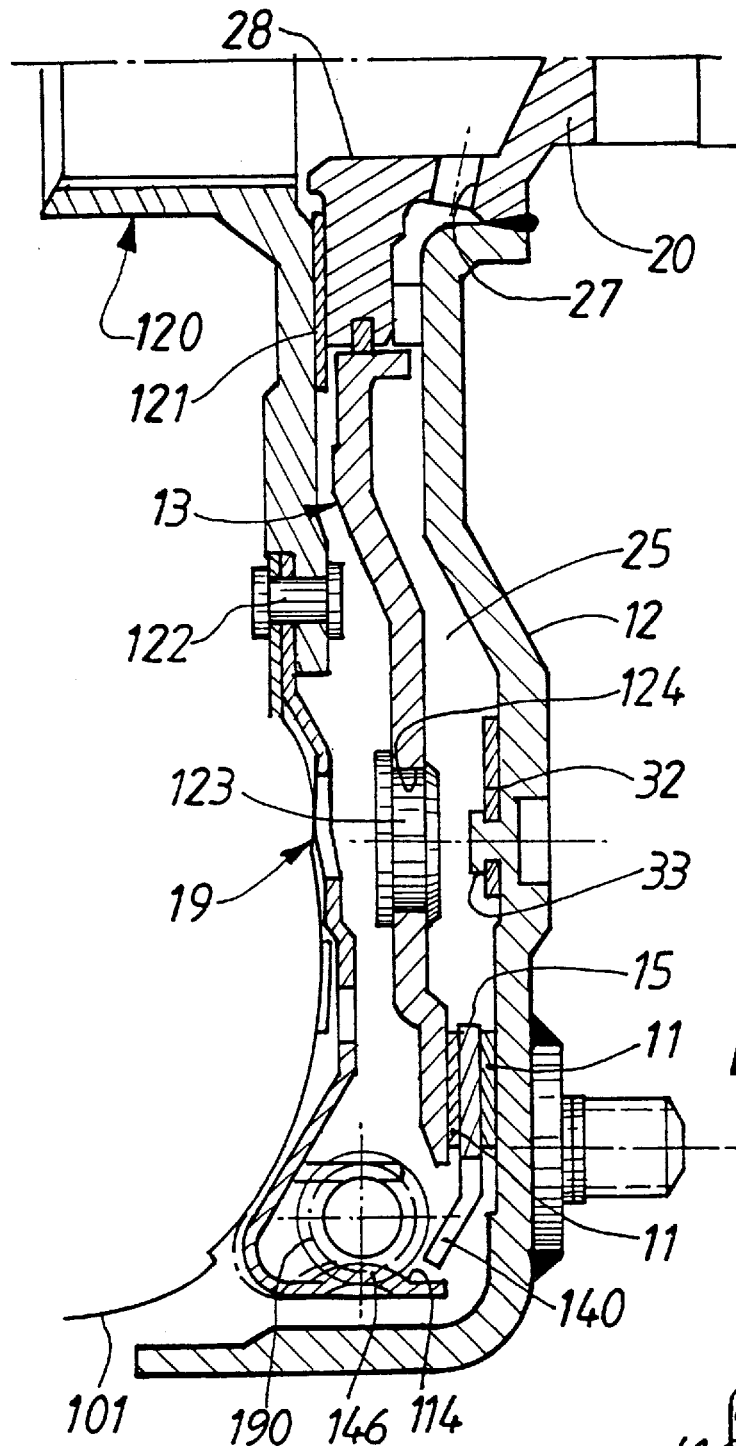
FIG. 9 is a half view in axial cross section of a lock-up clutch in another embodiment of the invention.
Figure 10:
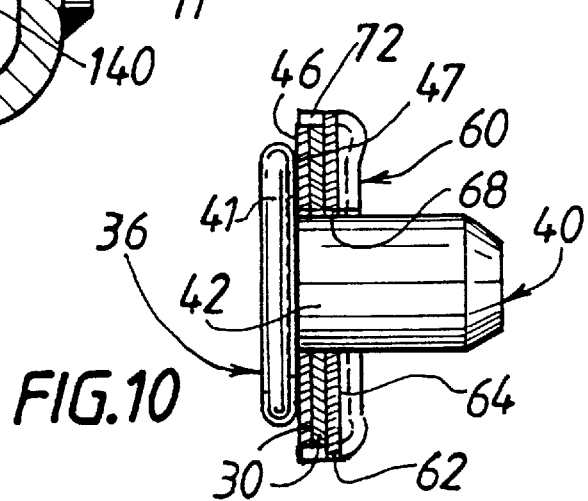
FIG. 10 is a view similar to FIG. 5, but showing this second embodiment of the invention.
Figure 11:
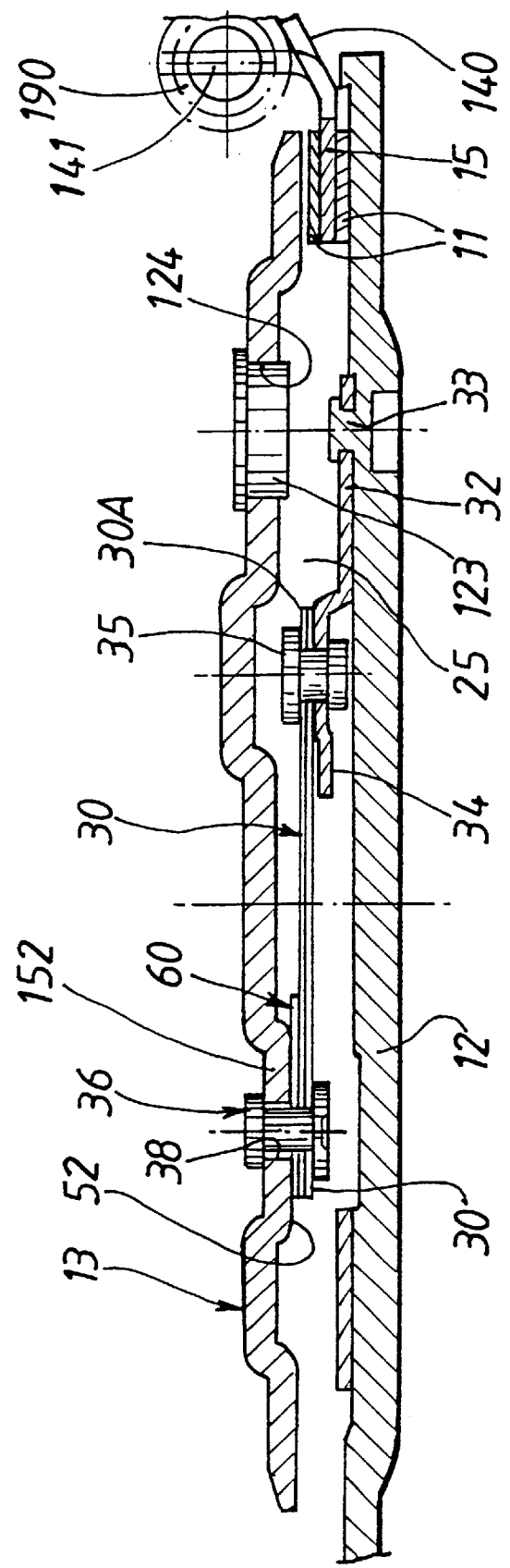

Reference is now made to FIGS. 9 to 11 showing a second embodiment of the invention. In this version each fastening means 36, which will here be referred to as the second fastening means, comprises only a single part, and consists of a rivet. The smooth portion 42 or shank of this rivet is extended axially so as to pass with a radial clearance through the through hole 38 in the piston 13. In this embodiment, the same intermediate ring 32 is used as in the version of FIG. 3, and it is necessary to provided through holes 124 in the piston 13, in axial coincidence with the rivets 33 which are formed by extrusion from the wall 12. The holes 124 enable at least one tool for riveting purposes to be passed through for the purpose of upsetting the shanks of the rivets 33. An anvil or counter-tool is arranged on the side of the wall 12 opposite to the piston 13, so as to support the wall 12 during the deformation of the rivets 33.

After the riveting operation, the holes 124 are stopped sealingly with the aid of obturating elements 123, which are plugs in this example and are here snap-fitted in the holes 124. In another version, the plugs 123 can be force-fitted in the holes 124. In a further version, the plugs 123 may be adhesively bonded or welded on the piston. The plugs 123 may be replaced by plate elements or other suitable closures. For greater detail, reference is invited to the specification of international patent application No. PCT/FR98/01393, and all the various forms described in that document may be envisaged in the present application.

In this particular embodiment, the first ends 30A of the tongues 30 are first secured to the intermediate ring 32 with the aid of the rivets 35 (i.e. the first fastening means), working on both sides of the intermediate ring 32. The piston 13 is then secured by means of the rivets 36 on the second ends 30B of the tongues 30, on which friction wedges 60 have previously been applied by force-fitting of the portion 42 in the tongues 30 and the wedges 60, which are generally as described above with reference to FIGS. 1 to 8. Then, after the friction disc 16 (FIG. 1) has been positioned, the intermediate ring 32 is finally fixed on the wall 12 by means of the rivets 33, and finally the holes 124 are closed by means of the plugs 123 or other obturating elements as described above. The rivets 35 extend through the lugs 34 as in FIGS. 1 to 8, that is to say with a radial clearance which is smaller than that which exists between the shanks 40 and the associated holes 38 of the piston 13.

The intermediate ring 32 may of course be fixed on the fixed wall 12 with the aid of rough washer elements, or friction wedges, interposed axially between the intermediate ring 32 and the wall 12, with the shanks of the rivets 33 passing with a radial clearance through the associated apertures formed in the ring 32 to enable the shanks of the rivets 33 to pass through.

In a modified version, the rivets 36 are first fixed on the piston 13, and the intermediate ring 32 on the fixed wall 12, after which the tongues 30 are secured on the lugs 34 using friction wedges. In that case, it is necessary to provide through holes in the piston 13 and wall 12 in axial alignment with the rivets 35. The wedges act axially between the lugs 34 and the tongues 30. Finally the through holes are closed. It is thus possible to reverse the structures, with the second ends of the tongues 30 being the ends which are associated with the lugs 34 and therefore with the wall 12.

FIG. 9 shows diagrammatically the turbine wheel 101 of the fluid coupling. The turbine wheel, which has vanes in the usual way, includes at its inner periphery an annular portion 102 which is secured by means of rivets 122 on a hub 120, which is splined internally for coupling the turbine wheel 101 with the driven shaft for rotation of the latter with it. The fluid passage in the driven shaft is in communication with the bore 28 of the centring nose 20, which in this example serves for guiding the piston 13. A low friction ring 121 is interposed axially between the hub 120 and the centring member 20.

The torsion damper 19 comprises a damper plate which is secured to the hub 120 by the rivets 122. The damper plate has at its outer periphery a portion which is configured so as to define a groove 114 which is open axially towards the fixed wall 12. Coil springs 190 are interposed circumferentially between the support ring 15 and the damper plate. For this purpose, the support ring 15, and therefore the friction disc 16, has at its outer periphery inclined lugs 140 for supporting the springs 190, together with axial lugs 141 with fingers, not visible in the Figures, which project circumferentially so as to penetrate into the circumferential ends of two consecutive springs 190.

The damper plate has in its outer periphery pressed-out portions 146 for engagement of the circumferential ends of two consecutive springs 190 mounted in the groove 114. The springs 190 are therefore carried by the friction disc 16 and are displaceable axially with the latter in the groove 114 of the damper plate. The torque is therefore transmitted axially from the disc 16 to the damper plate when the friction liners 11 are gripped between the piston 13 and the fixed wall 12.

In another version, the springs 190 are omitted, and the disc 16 meshes through its lugs 141 directly with the damper plate, in a coupling of the tenon and mortice type. For more detail, reference should be made to the specification of French patent application No. 98 02808 filed on Mar. 3, 1988, which also describes the torsion damper described above.

In all of the embodiments shown in the drawings, by causing the pressure on either side of the piston 13 to vary, for example by causing the pressure in the hydraulic control chamber 25 to vary, the piston 13 is displaced axially in one direction or the other so as to grip the friction liners 11 between the piston 13 and the fixed wall 12, or to release the liners. When the friction liners 11 are gripped (i.e. when the clutch is locked up), any relative movement between the turbine wheel and the impulse wheel is prevented, and the torque is transmitted from the driving shaft to the driven shaft through the friction disc 16, either elastically or rigidly. When the liners 11 are free (i.e. when the clutch is disengaged), the impulse wheel drives the turbine wheel by virtue of the flow of oil between the vanes of these wheels.

Due to the through holes, it is of course possible to replace the rivets 36 by bolts.

In one embodiment, these through holes are formed in the transverse fixed wall 12 in axial coincidence with the second fastening means 36 fastening the tongues to the piston. Thus in FIG. 12, to which reference is now made, a stepped through hole 224 is formed in the transverse wall 12 in axial coincidence with the through hole 38 in the piston 13 and a fastening rivet 36 which constitutes one of the second fastening means.

Figure 12:
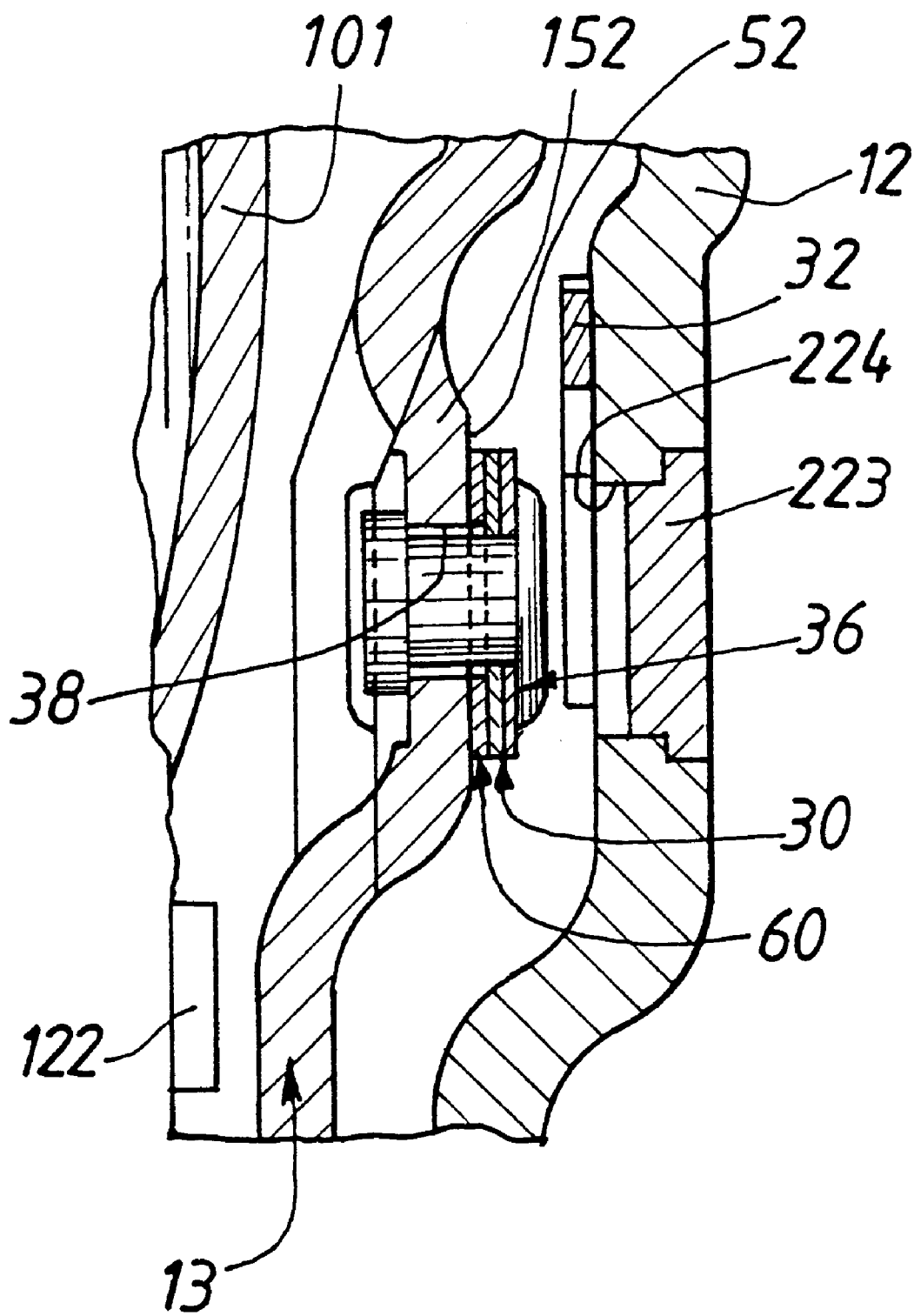
FIG. 12 is a scrap view showing the fastening of a tongue to the piston with a friction wedge interposed and with a through hole formed in the transverse wall, to illustrate a third embodiment of the invention.

FIG. 12 shows a double tongue 30 having an inner side face that faces towards the head of the rivet 36. The friction wedge 60 is interposed axially, and gripped, between this inner side face of the tongue and the external engagement face 52 of the piston 13, which is part of a local press-formed boss 152 formed in the piston, the latter being of metal. More precisely, the rivets 36 and the wedges 60 are fastened on the second ends of the tongues 30 by force-fitting the smooth portions of the rivets 36 in the through holes in the tongues and wedges. The first ends of the tongues 30 are then secured by riveting to the intermediate ring 32. It is of course possible to reverse the order of the first two of the above operations.

The intermediate ring 32, equipped with the tongues 30, is then fixed on the transverse wall 12. The friction disc is fitted in place, with the fixed wall 12 laid flat. Subsequently, the piston 13 is fitted over the shanks of the rivets 36. This operation is easy because the rivet shanks pass through the through holes 38 in the piston with a radial clearance.

The operation of riveting the shanks of the rivets 36 is then carried out. For this purpose, a counter-tool is passed through the hole 224, which in this example is cylindrical, so that the counter-tool bears on the head of the rivet 36, the free end of the shank of which extends beyond the piston 13.

The free end of the rivet 36 is upset using a suitable tool, so as to cause the material of the latter to flow into contact with the face of the boss 152 which faces away from the double tongue 30, thereby gripping the wedge 60. The hole 224 is subsequently closed with a stepped plug 223 which is force-fitted into the hole 224. In another version, the head of the plug 223 is welded or adhesively bonded on the wall 12.

The intermediate ring 32 may of course be integral with the tongues 30, in the manner described in French patent specification No. FR 2 726 620A.

In the light of FIG. 12, it will be seen that the ring 32 is first secured on the fixed wall 12, after which the free ends of the tongues, which are equipped with rivets and friction wedges, are fixed on the piston 13 using the holes 224.

In all cases, the friction wedge according to the invention is interposed axially, to hold in clamping engagement one of the ends, i.e. the one referred to as a second end, of the tongue 30, which may consist of at least two superimposed tongues, and one of the elements consisting of the piston or the fixed transverse wall, this being referred to as the second element of the clutch.

In general terms, the second fastening means (securing together this second element and the second end of the tongues) comprise at least one fastening shank, which is smooth and/or ridged or threaded, this fastening shank extending axially through the associated components, namely the tongue, the friction wedge and the second element, all via through holes formed in these components and axially aligned with each other.

The second fastening means hold the wedge between the lateral face 54 of the tongue 30, that is to say the inner side face or internal lateral face, and a lateral engagement face 52, that is to say the external lateral engagement face or outer side engagement face, these faces being formed on the second element in facing relationship with the inner side face of the tongue.

The said external lateral engagement face is defined in the accompanying drawings by local pressed-out elements formed in the metal piston 13. Such a pressed-out element can be seen at 152 in FIGS. 11 and 12.

It will be appreciated that the tongues are protected, and that in the case of riveting, plastic flow of the material of the shanks is produced on contact of the second element without destruction of the tongues.

It will be noted that the centring element 20 in FIG. 11 provides direct centring for the piston 13.

The number of friction wedges depends on the particular application and on the number of tongues and the value of the torque to be transmitted. For example, in FIG. 1 two tongues 3 diametrically opposed to each other may be provided with friction wedges, while the other two have none.

The rough surface portion of the friction wedge may be obtained by mechanical treatment of the face of the wedge concerned, or by deposition on that face of the wedge of a layer of a suitable rough material resistant to pressure. For example, the wedges may be of steel which is mechanically treated so as to make them rough. Both faces of the wedge may of course be rough, and the arm 70 may be provided with at least one rough face.

What is claimed is:

1. A lock-up clutch for releasably coupling together a driving member and a driven member of a fluid coupling, the clutch comprising: a first element and a second element; mounting means defining an axis of the clutch and carrying said first and second elements coaxially for rotation about the axis with the first and second elements offset axially from each other, one of said first and second elements comprising a transverse wall, with the mounting means retaining said wall against axial movement, the other one of said first and second elements comprising a piston, with the mounting means carrying the piston for rotation with the wall; at least one friction liner disposed axially between said first and second elements; a set of elongate tongues coupling said first and second elements for rotation together, the clutch defining a circumference centred on the axis, each said tongue extending lengthwise substantially along a chord of the circumference and having a first end and a second end;

an attachment member connecting said first ends of the tongues to said first element; a plurality of fastening means, each connecting the second end of a corresponding one of the tongues to the second element, each said tongue having an inner side face, the second element having an external lateral engagement face in axial facing relationship with the inner side faces of the tongues, each said fastening means comprising a first part and a second part, said first part being attached to the second end of a corresponding said tongue, each said first part comprising a head and a fastening shank extending the head parallel with the clutch axis, the second end of each tongue having a first through hole, each said shank extending through the corresponding said first through hole so as to project axially beyond the inner side face of the associated tongue, the inner side face of each tongue being held axially against the external lateral engagement face of the second element, wherein each said fastening means further includes a friction wedge having an aperture, the corresponding said shank of the first part of the associated fastening means extending through said aperture whereby the friction wedge is interposed axially between the inner side face of the associated tongue and the external lateral engagement face of the second element, each friction wedge having an inner side face comprising a surface portion in axial engagement against the second element, at least said surface portion being rough, wherein each friction wedge comprises a washer portion having said aperture and rough surface portion, an indexing arm projecting radially from the washer portion and in substantially the same plane, the indexing arm being adjacent to the inner side face of the corresponding tongue and having a free end; and two opposed longitudinal edges, with each indexing lug of the corresponding wedge extending axially along a respective one of the two said edges of the tongue.

2. A clutch according to claim 1, wherein, in each friction wedge, the rough surface portion surrounds the aperture.

3. A clutch according to claim 1, wherein, in each friction wedge, the indexing arm defines an acute angle with the plane of the inner side face of the tongue.

4. A clutch according to claim 1, further including a casing having a transverse wall, which is also the transverse wall, the first and second elements being the transverse wall and the piston respectively.

5. A lock-up clutch for releasably coupling together a driving member and a driven member of a fluid coupling, the clutch comprising: a first element and a second element; mounting means defining an axis of the clutch and carrying said first and second elements coaxially for rotation about the axis with the first and second elements offset axially from each other, one of said first and second elements comprising a transverse wall, with the mounting means retaining said wall against axial movement, the other one of said first and second elements comprising a piston, with the mounting means carrying the piston for rotation with the wall; at least one friction liner disposed axially between said first and second elements; a set of elongate tongues coupling said first and second elements for rotation together, the clutch defining a circumference centred on the axis, each said tongue extending lengthwise substantially along a chord of the circumference and having a first end and a second end; an attachment member connecting said first ends of the tongues to said first element; a plurality of fastening means, each connecting the second end of a corresponding one of the tongues to the second element, each said tongue having an inner side face, the second element having an external lateral engagement face in axial facing relationship with the inner side faces of the tongues, each said fastening means comprising a first part and a second part, said first part being attached to the second end of a corresponding said tongue, each said first part comprising a head and a fastening shank extending the head parallel with the clutch axis, the second end of each tongue having a first through hole, each said shank extending through the corresponding said first through hole so as to project axially beyond the inner side face of the associated tongue, the inner side face of each tongue being held axially against the external lateral engagement face of the second element, wherein each said fastening means further includes a friction wedge having an aperture, the corresponding said shank of the first part of the associated fastening means extending through said aperture whereby the friction wedge is interposed axially between the inner side face of the associated tongue and the external lateral engagement face of the second element, each friction wedge having an inner side face comprising a surface portion in axial engagement against the second element, at least said surface portion being rough, wherein, in each friction wedge, the said rough surface portion surrounds the said aperture, each said friction wedge is applied to the second end of the corresponding tongue, and the first part of each said fastening means is applied to the corresponding friction wedge by force-fitting the corresponding fastening shank in the aperture of the wedge.

6. A clutch according to claim 5, wherein the second end of each tongue is applied to the first part of the corresponding fastening means by force-fitting of the fastening shank in the corresponding said first through hole in the second end of the tongue.

* * * * *